Oct. 11, 1927.
J. V. MARTIN
1,644,787
CRAFT PROPULSION MEANS
Original Filed Jan. 11, 1918  4 Sheets-Sheet 1
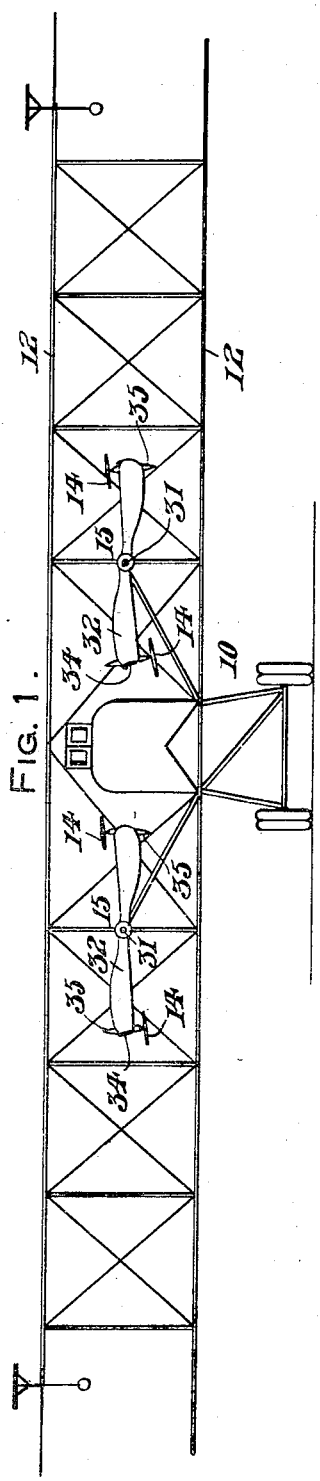
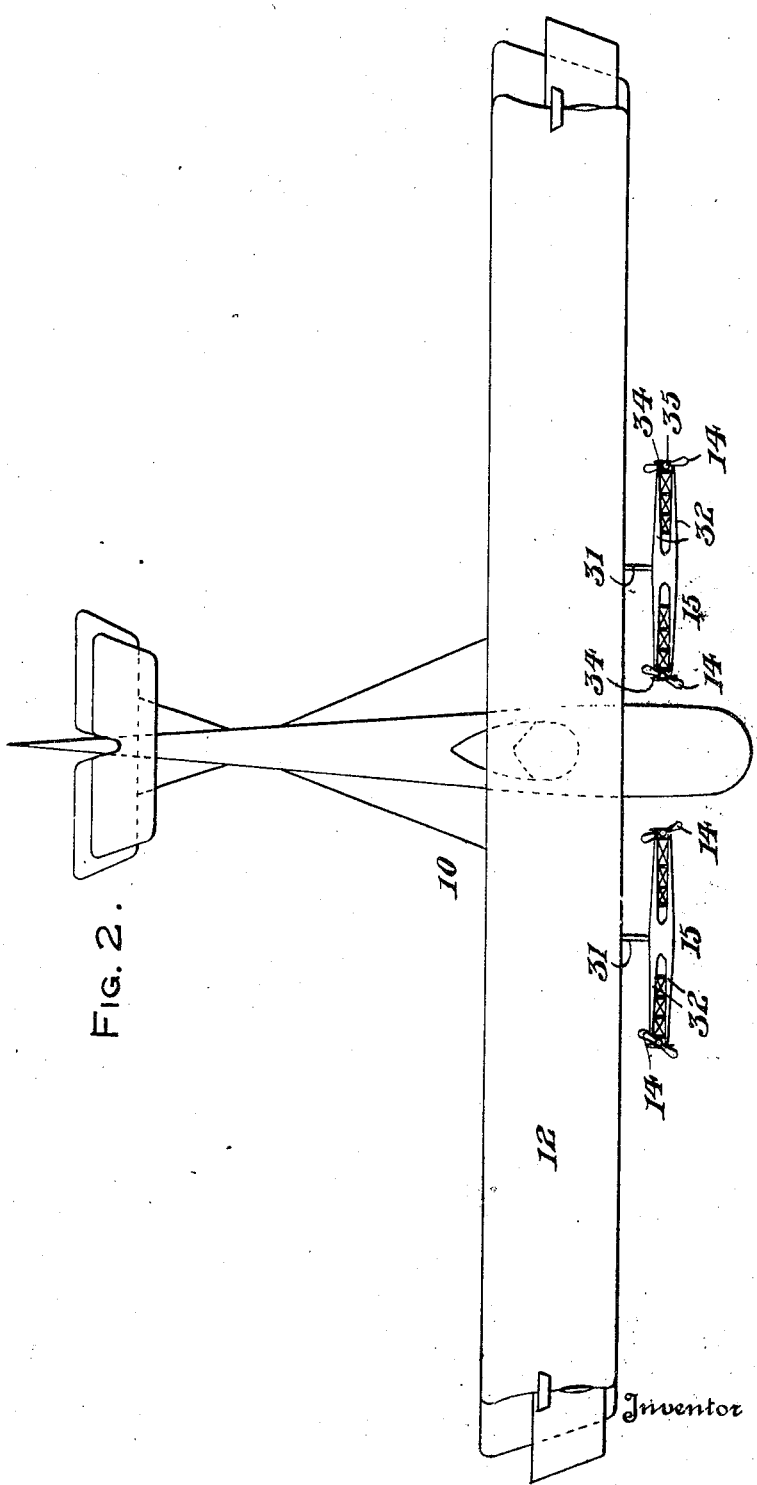
Inventor
J. V. Martin
By A. M. Wilson
Attorney

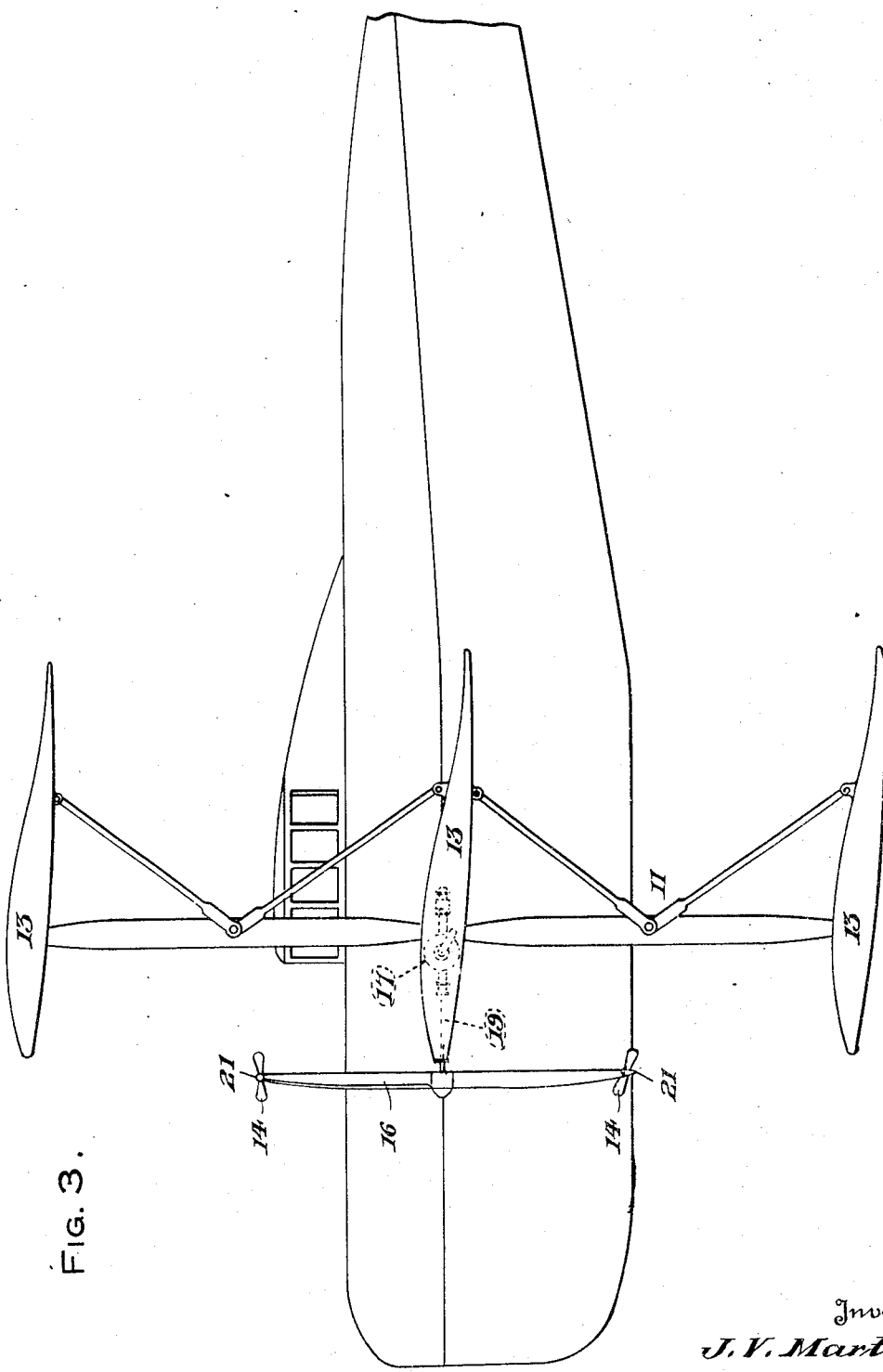

Oct. 11, 1927.
J. V. MARTIN
1,644,787
CRAFT PROPULSION MEANS
Original Filed Jan. 11, 1918    4 Sheets-Sheet 3
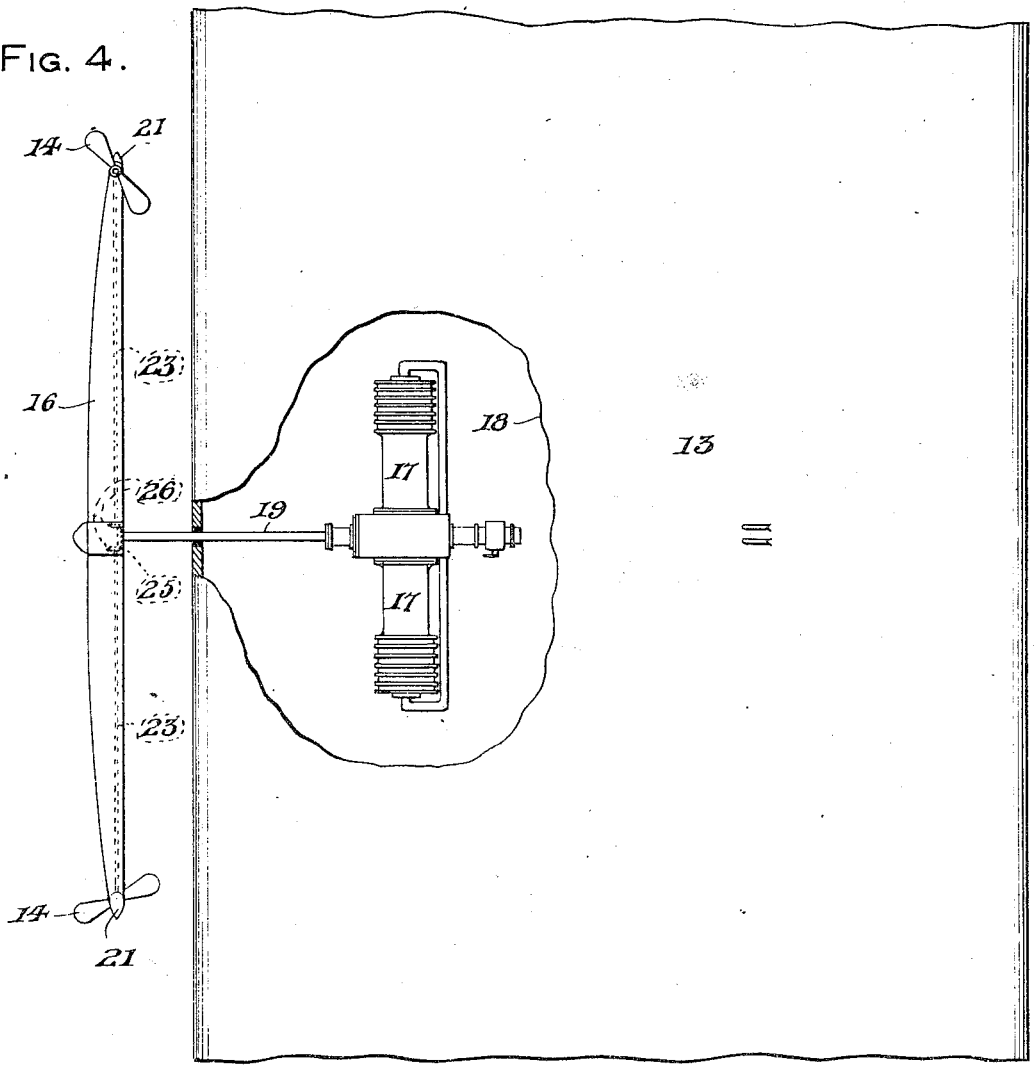
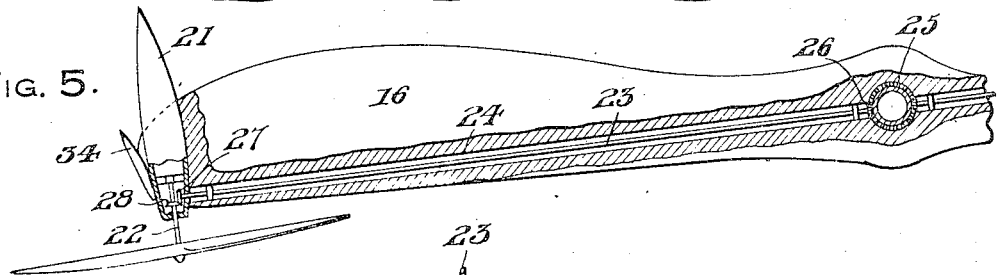
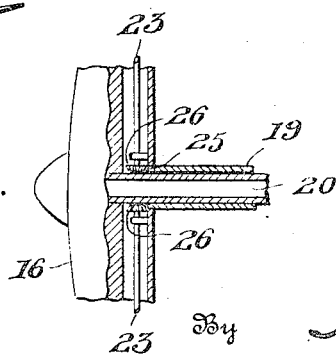
Inventor
J. V. Martin
By
Attorney Oct. 11, 1927.
J. V. MARTIN
1,644,787
CRAFT PROPULSION MEANS
Original Filed Jan. 11, 1918   4 Sheets-Sheet 4
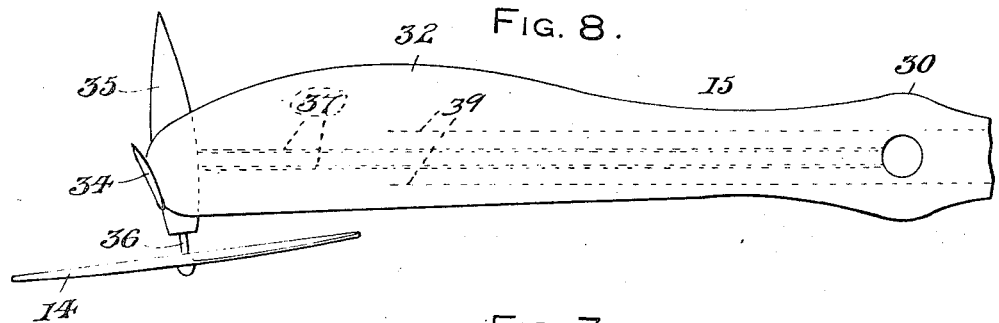
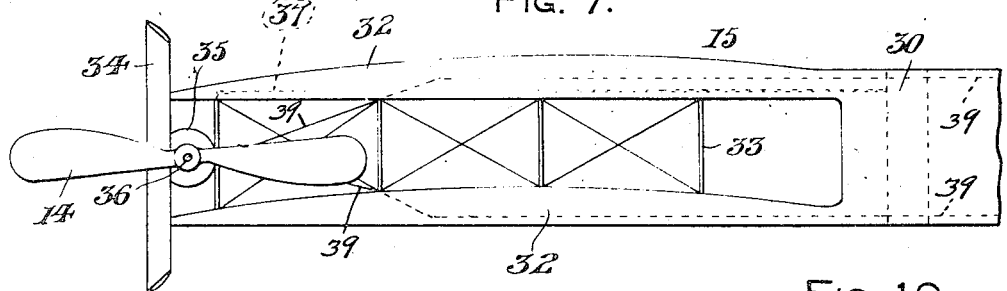
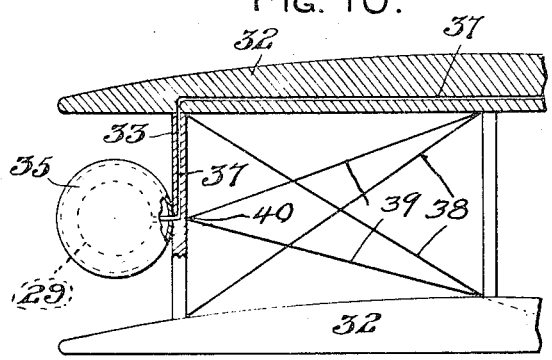
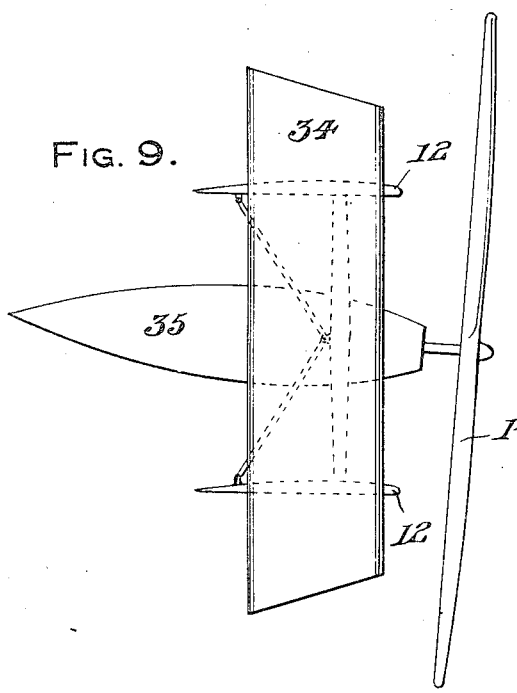
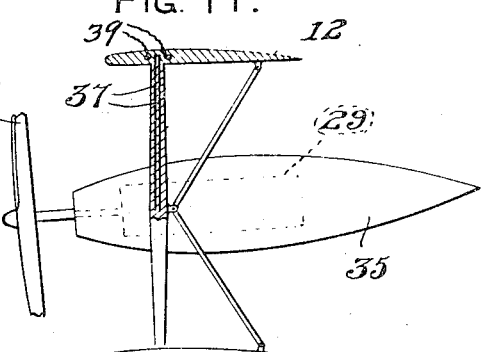
Inventor
J. V. Martin
By N. M. Wilson
Attorney Patented Oct. 11, 1927.

1,644,787

UNITED STATES PATENT OFFICE.

JAMES V. MARTIN, OF GARDEN CITY, NEW YORK.

CRAFT-PROPULSION MEANS.

Application filed January 11, 1918, Serial No. 211,387. Renewed January 16, 1923.

This invention relates to the propulsion of bodies immersed in a fluid and is more especially adapted for aircraft propulsion. The main object of the invention is the provision of an improved method of applying energy for revolving an aeroplane propeller, the application of such energy being to better advantage in point of leverage than is possible with the present day methods.

The term "foil" as herein employed includes a body projected through a fluid for a dynamic reaction, foils being termed aquafoils when employed in water and aerofoils when employed in air and gases. An aerofoil is any shape projected through the atmosphere for an aerodynamic action. In aeroplanes, aerofoils are divided into sustaining and non-sustaining aerofoils and the latter into propelling and controlling aerofoils.

The drift of an aerofoil is the resistance which the aerofoil offers to propulsion, exclusive of inertia and gravity. The lift of an aerofoil is the tendency of the aerofoil, exclusive of inertia or gravity, to depart from the plane of propulsion.

My experiments in wind-tunnels and in actual flight demonstrate that the lift of a well designed aerofoil exceeds the drift thereof in the ratio of 30 to 1 at 100 miles per hour and more improved forms of aerofoils may increase this ratio.

In present day aeroplanes, double advantage is taken of this lift drift ratio in designing an aeroplane with a main aerofoil so related to the aeroplane mass and propelling energy that it normally opposes its lift to the aeroplane's weight and its drift to the direction and amount of propelling energy. This is the first application of the aeroplane principle.

But the lift drift ratio of aeroplanes is turned to advantage in a compound sense by revolving an aerofoil in the form of a tractor screw or propeller and here there is opposed the lesser or drift force of the main aerofoil to the greater or lift force of the screw aerofoil.

At this point this advantageous application of the principle ends, as it is, and always has been the practice to apply some other form of energy than the lift of another aerofoil to overcome the drift of the screw aerofoil where the screw aerofoil overcomes the drag of a main aerofoil. It is the essence of my invention to overcome this drift of the primary screw aerofoil by the lift of a secondary screw aerofoil.

Since the terms lift, drift and propeller are words which are not well suited by derivation to my application, the term screw will be employed for denoting either a propeller or tractor, while $Ky$ will designate lift and $Kx$ will designate drift. In applying and $Ky$ of a secondary screw to overcome the $Kx$ of a primary screw aerofoil, so that the $Ky$ of the primary screw may overcome the $Kx$ of the main aerofoil, advantage should be taken of the selective positions relative to leverage. For this reason, I have selected the portion of the primary screw nearer the periphery of revolution than the hub as the best area of power application and the same is decidedly advantageous over the present practice.

My invention is also designed to increase the area of the primary screw without increasing its span or cord and to strengthen the screw for resisting distortion due to $Ky$ while increasing $Kx$ as little as possible.

A further object of my invention is to strengthen the tensile properties of the primary screw for resisting centrifugal forces and also reducing the additional centrifugal force upon the primary screw incident to my novel method of propulsion.

A still further object of the invention is to provide a simple and practical method of transmitting energy, either actual as shaft transmission or potential as fuel for a motor to overcome the $Kx$ of a secondary screw, and to supply motor energy. It is also contemplated to provide a compartment for a power unit within the section of an aerofoil for driving the aeroplane.

With these general objects in view and others that will become apparent as the nature of the invention is better understood, the same consists in the novel combination, construction and arrangement of parts hereinafter more fully described, illustrated in the accompanying drawings, and then claimed.

In the drawings forming a part of this application and in which like designating characters refer to corresponding parts throughout the several views, Figure 1 is a front elevation of an aeroplane embodying the principles of my invention.

Figure 2 is a top plan view thereof.

Figure 3 is a side elevation of a tri-plane equipped with my device.

Figure 4 is a plan view of a portion of an aerofoil as employed in Figure 3 showing the arrangement of power plant and propeller employed therewith.

Figure 5 is an elevational view of a portion of the primary screw aerofoil showing the arrangement of driving connections for the secondary screw aerofoil.

Figure 6 is a detail view partly in section showing the mounting means for the primary screw and the adjacently positioned gearing for the secondary screws.

Figure 7 is a side elevation of a stronger form of primary screw arranged with a secondary screw thereon.

Figure 8 is a front elevation of the same.

Figure 9 is an end view of the primary screw shown in Figure 7.

Figure 10 is a view of an end portion of the primary screw partially shown in section illustrating one manner in which the transmission of energy and control may be employed, and Figure 11 is a transverse sectional view thereof showing a portion of the secondary screw.

The employment of the principles of my invention are herein illustrated in connection with a biplane 10 in Figures 1 and 2 of the drawings and in connection with a triplane 11, illustrated in Figure 3 thereof, the main aerofoils 12 of the biplane being similar in construction to the main aerofoils 13 of the triplane. The air resistance which the aerofoil offers to propulsion is called "drag" and designated $x$, while the reaction tending to divert the aerofoil from the direction of the plane of propulsive effort is termed "lift" and designated $y$.

Broadly considered, the principle of the invention is the applying of the lift of secondary screws 14 to overcome the drift of the primary screw aerofoils 15 and 16 of the biplane and triplane respectively, so that the lift of the primary screw may overcome the drift of the main aerofoil member thereof, but it will be observed that the arrangement of biplane parts such as trussing, interplane motor disposition and conduits shown in Figs. 7-8-9-10 and 11 and here illustrated for rotary movement is equally adapted for progressive flight. It will be noted that the secondary screw aerofoil is positioned most advantageously upon the primary screw with respect to leverage, being nearer the periphery of revolution thereof than it is to the hub which is the best area of power application for the primary screw aerofoil.

A power plant in the form of a motor 17 is provided and closed within the skin 18 of the intermediately positioned main aerofoil 13 of the triplane, a fixed tubular casing 19 extending from the motor projecting forwardly of the aerofoil 13 being provided with the motor driving shaft 20 axially journaled therethrough. The primary screw aerofoil 16 is fixed upon the outer free end of the shaft 20 designed to revolve therewith when the aerofoil 16 is employed as a tractor for the aeroplane 11.

A fuselage 21 is mounted adjacent each tip or extremity of the screw 16 transversely thereof and projecting in opposite directions, a shaft 22 being journaled in the forward end of each fuselage provided with the secondary screws 14 heretofore noted. Oppositely extending connecting shafts 23 are journaled within a longitudinal bore 24 of the screw 16 operatively connected at their inner ends to the toothed adjacent end 25 of the casing 19 by means of bevelled pinions 26 carried by the inner ends of the shafts 23. The outer ends of the shafts 23 are provided with pinions 27 in constant mesh with similar pinions 28 arranged upon the shafts 22. In this manner it will be seen that the motor 17 is designed to drive the primary screw aerofoil 16 by means of the shaft 20, while the secondary screws 14 will be propelled by their operative connections with the casing 19. The lift of the secondary screws 14 is applied in this manner to overcome the drift of the primary screw aerofoil 16, so that the lift of the primary screw 16 may overcome the drift of the main aerofoil 13. It will be understood that any form of motor 17 may be employed such as a gas or oil engine or a turbine or electric motor and any foil or form of craft may be designed for the accommodation of such a motor having main and auxiliary screws.

It will also be understood that the same principles may be carried out by providing the auxiliary screws such as 14 shown in Figures 1, 2, 7 to 11 inclusive of the drawings with individual driving motors such as 29. The primary screw aerofoil 15 is of double formation designed to increase the area thereof without increasing the span or chord, the strength of the screw being increased for resisting distortion due to lift while increasing the drift as slightly as possible. The screw 15 has a central hub portion 30 secured to a driving shaft 31 of the aeroplane 10 whereby the primary screw aerofoil 15 is revolved as a tractor or propeller aerofoil. Identically formed opposite sides 32 extend from the hub portion 30 affording advantages of a double screw and arranged with K-braces 33 for rigidly connecting the sides 32 together.

Terminal anti-centrifugal aerofoils 34 adapted for bearing inwardly toward the hub when revolved are preferably arranged between the free ends of the screw sides 32 while a fuselage 35 is transversely arranged adjacent each end of the primary screw 15. The secondary screws 14 are carried by shafts 36, one of which is arranged for the motor 29 of each fuselage 35 at the forward end of the latter. The fuselages 35 are oppositely positioned at the opposite positions on the screw 15, whereby the secondary screws 14 are arranged at opposite sides of the screw 15 and are adapted to revolve and to cause the continued turning of the screw 15 upon its axis.

The motors 29 may be of any desired form such as explosive or electric motors, while turbines may be employed if desired. A plurality of conduits 37 are longitudinally arranged through the screw 15 as herein indicated, extending through one side 32 thereof and communicating with the fuselage 35 through a K-brace member 33, the inner ends of the conduits 37 communicating with the hollow driving shaft 31, of the screw 15. It will be understood that the motors 29 may be adapted for operation in this manner by means of fuel or power supplied from a suitable source through the shaft 31 and conduits 37.

The main shaft 31 may be employed for driving the screw 15, while the auxiliary screws 14 assist in the operation or the power from the main shaft 31 may be interrupted and the auxiliary screws 14 relied upon for continuing the operation of the screw 15.

The lift of the secondary screws 14 is applied in this manner to overcome the drift of the primary screw aerofoil 15, so that the lift of the primary screw 15 may overcome the drift of the main aerofoil member 13 of the aeroplane. This arrangement of terminal secondary screws strengthens the force of operation of the primary screw and also reduces the centrifugal force upon the primary screw, it being noted that when in operation, the screw 16 will utilize power at its center and extremities simultaneously, uniformly influencing the primary screw in a normal direction.

The tensile properties of the primary screw aerofoil 15 are strengthened by guy wires 39 connecting the K-braces 33 together while further strengthening wires 39 run longitudinally within the side portions 32 of the aerofoil being suitably anchored at points 40 adjacent the opposite ends of the aerofoil. These wires 39 also overcome the centrifugal force exerted upon the aerofoil, the same being best illustrated in Figures 7, 8 and 11 of the drawings.

What I claim as new is:—

1. In combination with biplane aeroplane aerofoils, a power unit disposed intermediate said aerofoils and to one side of said aerofoil's centre, a propeller shaft driven by said power unit and inclined at an angle to the chord of the said aerofoils a streamlined cover enclosing the said power unit, and a conduit leading from the interior of one of the said aerofoils to the said power unit.

2. In combination with the primary screw of an aeroplane, a secondary screw mounted on the blade of the primary screw, and stabilizing aerofoils upon the mounting blade adapted for resisting the centrifugal force due to the revolution of the secondary screw so mounted.

3. An aeroplane screw comprising a hub, double blades projecting from the hub, each of said blades having two side portions, braces between the sides of said blades, a fuselage casing at each end of the screw between the sides of the blades, and motor driven aerofoil screws carried by the said casings.

4. In aircraft, the combination of sustaining and propelling aerofoils wherein the propeller which normally propels the sustaining aerofoil is itself propelled entirely by another propelling aerofoil.

5. In an aircraft, three aerofoils one of which is a sustaining aerofoil, another of said aerofoils approximately at right angles to the sustaining aerofoil adapted to propel the latter, and a third aerofoil carried by the second named aerofoil at approximately right angles to the plane of progression of the second named aerofoil and adapted to propel the same.

In testimony whereof I affix my signature.

JAMES V. MARTIN.